July 15, 1924.
J. R. BARTHOLOMEW
AUTOMOTIVE BRAKE
Filed Oct. 4, 1922
1,501,159
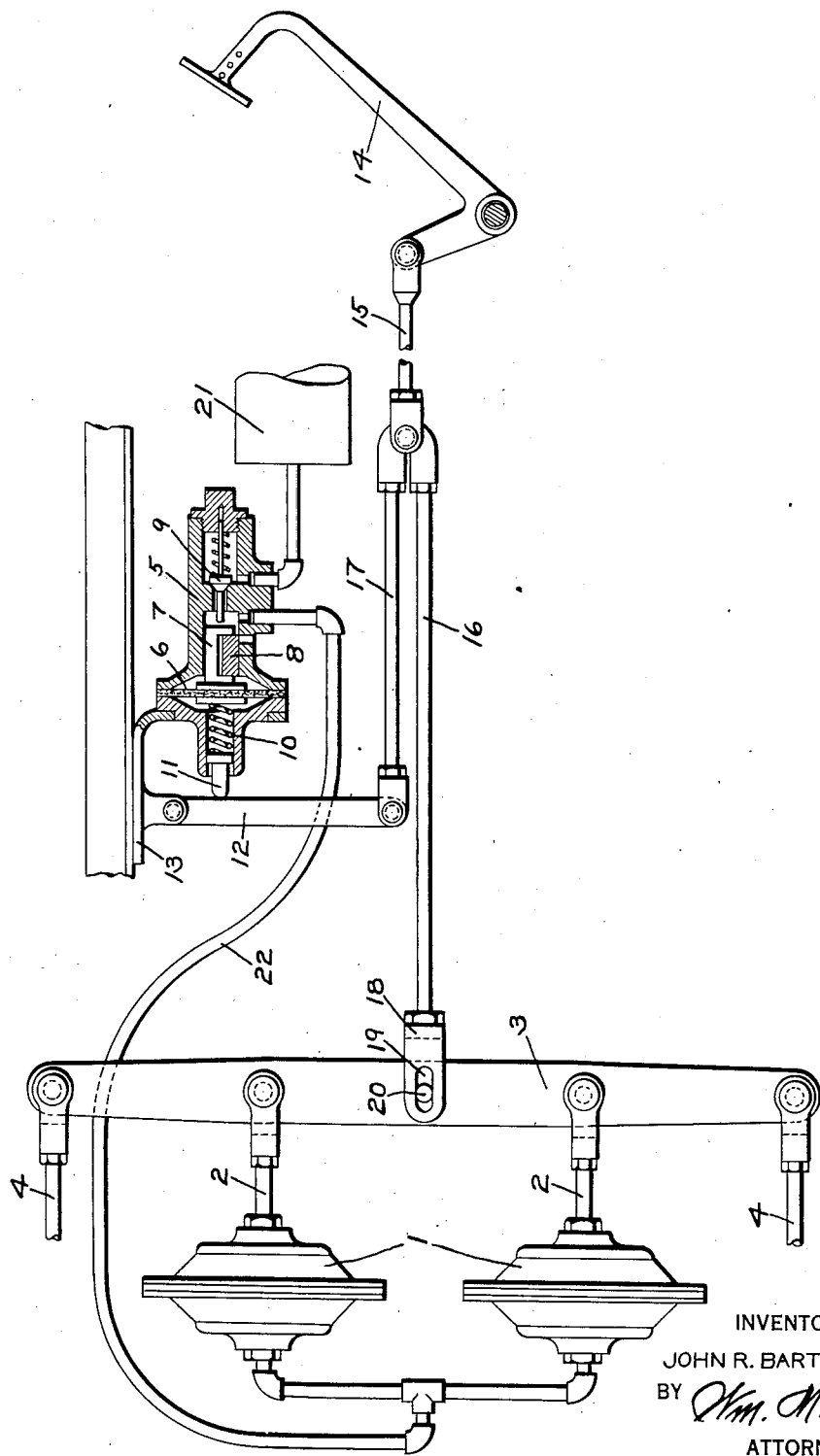
INVENTOR
JOHN R. BARTHOLOMEW
BY Wm. M. Cady
ATTORNEY Patented July 15, 1924.

1,501,159

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed October 4, 1922. Serial No. 592,238.

*To all whom it may concern:*

Be it known that I, JOHN R. BARTHOLOMEW, a citizen of the United States, residing at Berkeley, in the county of Alameda and State of California, have invented new and useful Improvements in Automotive Brakes, of which the following is a specification.

This invention relates to brakes for motor vehicles, and more particularly to a combined mechanical and fluid pressure brake.

The principal object of my invention is to provide a fluid pressure brake and manually operated means for controlling the brakes mechanically and for also controlling the fluid pressure brakes.

Other objects and advantages will appear in the following more detailed description of the invention.

In the accompanying drawing, the single figure is a diagrammatic view, partly in section, of a motor vehicle brake equipment embodying my invention.

As shown in the drawing, the brake equipment may comprise one or more brake chambers 1 each containing a flexible diaphragm (not shown) adapted to be operated by fluid under pressure for projecting a push rod 2. The push rod 2 may be connected to an equalizing bar 3 having its ends pivotally connected to pull rods 4 through which the brakes of the motor vehicle are applied and released.

For controlling the fluid pressure brakes, a valve device may be provided comprising a casing 5 having a diaphragm chamber containing a flexible diaphragm 6. A stem 7 carried by the diaphragm 6 is adapted to operate a release slide valve 8 and a supply valve 9. A coil spring 10 acts against one side of the diaphragm and is engaged by a movable member 11.

A lever 12, pivotally mounted on the supporting bracket 13, engages the member 11, so that movement of the lever operates the member 11 to compress the spring 10. A pedal lever 14, which may be the foot operated lever usually employed for operating the brakes mechanically, is connected through a link 15 with a pull rod 16 for operating the brakes mechanically and with a pull rod 17 which is pivotally connected to the lever 12 for controlling the fluid pressure brakes.

The rod 16 is operatively connected to the equalizing bar 3 through a yoke 18 having elongated slots 19 in which engage a pin 20 carried by the bar 3.

If it is desired to apply the brakes, the pedal lever 14 is depressed by the foot of the operator, causing a forward movement of the pull rod 17, so that lever 12 depresses the member 11, compressing the spring 10. Diaphragm 6 is then operated by the pressure of spring 10 to open the supply valve 9 and admit fluid under pressure from a reservoir 21, containing fluid under pressure, through pipe 22 to the brake chambers 1. The diaphragms in the brake chambers 1 are thereupon operated to project the push rods 2, moving the equalizing bar 3 and the pull rods 4 to apply the brakes.

It will be noted that while the initial movement of the pedal lever 14 operates the pull rod 16 as well as the rod 17, the movement of the rod 16 is not effective to apply the brakes mechanically, since the lost motion movement due to the slots 19 in the yoke 18 prevents the transmission of power from the rod 16 to the bar 3. When the brakes are applied by fluid pressure, the equalizing bar 3 moves forward and the slots 19 permit relative movement of said bar with respect to the rod 16, so that the rod 16 cannot be moved forward and thus cause a further forward movement of the rod 17 and the lever 12, which of course would cause a further compression of spring 10 and a further supply of fluid to the brake chambers when not intended.

It will also be noted that the forward movement of the equalizing bar 3 causes the forward movement of pin 20 in the slots 19, so that further lost motion is provided in case the pedal lever 14 is further depressed to apply the fluid pressure brakes with increased force, without causing a mechanical movement of the equalizing bar 3 by the further movement of the pull rod 16.

If, for any reason, the fluid pressure brakes should fail to act when the pedal lever is depressed, then as soon as the lost motion due to the slots 19 at the rear of pin 20 is taken up, the continued depression of the pedal lever 14 will operate through the pull rod 16 to actuate the equalizing bar 3 and thus apply the brakes mechanically.

By reason of the above described construction it will be seen that while the same manually operated mechanism is employed for controlling the brakes mechanically and by fluid under pressure, the operator is only required to press the pedal lever with a light force, merely sufficient to operate the lever 12, so long as the fluid pressure brake is operative. On the other hand, if the fluid pressure brake should fail, the brakes will be applied mechanically by the movement of the same pedal lever.

It will be understood that the manual control may be effected by mechanism adapted to be operated either by the hand or the foot of the operator.

Having now described my invention, what I claim as new and desire to secure by Letters Patent, is:—

1. In an automotive brake, the combination with a fluid pressure brake, of manually operable means adapted upon initial movement to apply the fluid pressure brake and means for applying the brakes mechanically upon a further movement of said manually operable means only in case the fluid pressure brake fails to act.

2. In an automotive brake, the combination with a brake applying member, fluid pressure means for operating said member, mechanical means for operating said member, and manually operable means for controlling said fluid pressure means and said mechanical means, of means for normally preventing the operation of the mechanical means by said manually operable means during the initial movement of said manually operable means.

3. In an automotive brake, the combination with a brake applying member and a mechanically operated member for operating said brake applying member, of a lost motion connection between said brake applying member and said mechanically operated member for permitting movement of said mechanically operated member relative to the brake applying member and movement of the brake applying member relative to the mechanically operated member.

4. In an automotive brake, the combination with a brake applying member and a mechanically operated member for operating said brake applying member, of a lost motion connection between said brake applying member and said mechanically operated member for permitting movement of said mechanically operated member relative to the brake applying member and movement of the brake applying member relative to the mechanically operated member, and fluid pressure means for also operating said brake applying member.

5. In an automotive brake, the combination with a brake applying member and a manually operable member for mechanically operating said brake applying member, of means permitting movement of said brake applying member relative to said manually operated member and movement of said manually operated member relative to said brake applying member and fluid pressure means controlled by said manually operable member for also operating said brake applying member.

In testimony whereof I have hereunto set my hand.

JOHN R. BARTHOLOMEW.